United States Patent [19]

Nakamura et al.

[11] Patent Number: 4,736,143
[45] Date of Patent: Apr. 5, 1988

[54] TORQUE CONTROL APPARATUS FOR ROTARY MACHINE

[75] Inventors: Yozo Nakamura; Mitsuru Nakamura; Sigeru Machida, all of Ibaraki; Tsunehiro Endo, Hitachiota; Hiroaki Hata, Tochigi, all of Japan

[73] Assignee: Hitachi, Ltd., Tokyo, Japan

[21] Appl. No.: 915,383

[22] Filed: Oct. 6, 1986

[30] Foreign Application Priority Data

Oct. 7, 1985 [JP] Japan .................. 60-223181

[51] Int. Cl.⁴ ............................................. H02P 7/00
[52] U.S. Cl. .................... 318/432; 318/311; 318/312; 318/332; 318/433
[58] Field of Search ............... 318/138, 254, 432, 433, 318/309, 311, 312, 318, 319, 321, 323, 332

[56] References Cited

U.S. PATENT DOCUMENTS

| | | | |
|---|---|---|---|
| 3,206,665 | 9/1965 | Burlingham | 318/312 |
| 3,764,888 | 10/1973 | Anderson | 318/318 X |
| 4,103,216 | 7/1978 | Hayes | 318/254 X |
| 4,218,735 | 8/1980 | McCutcheon | 364/400 |
| 4,400,654 | 8/1983 | Elliott | 318/312 |
| 4,543,516 | 9/1985 | Kobori et al. | 318/318 |
| 4,563,623 | 1/1986 | Matsuka | 318/311 |
| 4,604,036 | 8/1986 | Sutou et al. | 417/18 |

FOREIGN PATENT DOCUMENTS

| | | | |
|---|---|---|---|
| 56-91689 | 7/1981 | Japan | 318/311 |
| 58-198179 | 11/1983 | Japan | 318/432 |
| 59-169376 | 9/1984 | Japan | 318/309 |
| 59-169378 | 9/1984 | Japan | 318/309 |

Primary Examiner—Bentsu Ro
Attorney, Agent, or Firm—Antonelli, Terry & Wands

[57] ABSTRACT

A torque control apparatus for a compressor driven by a motor through a main shaft, in which variations of the rotation speed of the main shaft due to torque variations are detected at selected angular positions of rotation of the main shaft. Current values to be supplied to the motor for eliminating the rotation speed variations depending on the angular positions of rotation of the main shaft are computed and stored during at least one revolution of the main shaft, and, in the next revolution of the main shaft, that is, when the main shaft rotates then to a 360° advanced angular position, the motor current is controlled on the basis of the current values supplied for at least one revolution of the main shaft, thereby eliminaitng variations of the rotation-speed of the main shaft.

11 Claims, 10 Drawing Sheets

47 ▽$a_i$ ----- MULTIPLIER ($x_i \times a_i$)

48 [T] ------ DELAY ELEMENT DELAYING INPUT BY UNIT TIME T (PULSE WIDTH)

49 Ⓢ ----- ADDER $\Sigma_i a_i x_i$

TORQUE CONTROL APPARATUS FOR ROTARY MACHINE

BACKGROUND OF THE INVENTION

This invention relates to a torque control apparatus which is generally applicable to any one of various rotary machines, for example, a compressor in which a load element is driven by a motor, and more particularly to a torque control apparatus suitable for application to a rotary machine in which load torque varies periodically.

JP-A-No. 60-60286 published on Apr. 6, 1985 (corresponding to U.S. Pat. No. 4,604,036 issued, on Aug. 5, 1986) discloses a torque control apparatus in which, in order to minimize the difference (a difference torque) between a load torque of a compressor of a refrigerator and an output torque of a motor driving the compressor through a main shaft, an attempt is made so as to cause the motor to produce an output torque having a pattern which varies in synchronism with variation of the load torque depending on the angular position in one revolution.

In the disclosed apparatus, however, the waveform representing a variation of the load torque is obtained on the basis of a signal, such as pressure variation in a compressor, derived from a machine effecting the refrigeration cycle. Accordingly, the waveform change thus obtained is delayed relative t the actually occurring change in the load torque waveform, and the resultant control of the output torque of the motor cannot completely eliminate vibration of the compressor housing and its supporting system in the direction of rotation of the main shaft.

SUMMARY OF THE INVENTION

It is an object of the present invention to provide a torque control apparatus for a rotary machine, in which current supplied to a motor element is controlled so that the motor element produces an electromagnetic torque having a pattern which varies in synchronism with and equally to the variation of a load torque of a load element, depending on angular position of a main shaft of the rotary machine in one revolution, thereby reducing the difference torque substantially to zero and minimizing variations of the rotation speed of the main shaft, hence, vibration of a machine housing in the direction of rotation of the main shaft.

Another object of the present invention is to provide a torque control apparatus which can eliminate the difference torque in a low rotation speed range lower than about 2,000 rpm.

In a rotary machine such as a closed-type compressor, variation of the rotating speed of the main shaft in one revolution in the rotary side, and the vibration of the compressor housing in the rotating direction of the main shaft in the stationary side are derived from the difference between a load torque of a compression element and an electro-magnetic torque of a motor element during one revolution of the main shaft.

Figure 12:
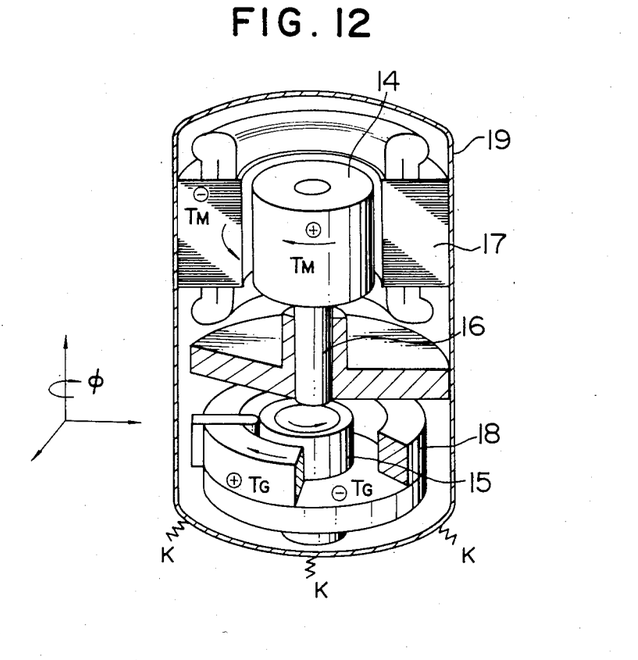
FIG. 12 shows torques produced in a rotary machine.

FIG. 12 illustrates schematically the reason why vibration occurs in a rotary compressor, by way of example. A compression element and a motor element are each composed of a rotating side such as rotors 14, 15 and a main shaft 16 and a stationary side such as stators 17, 18 and a housing 19. In the compression and motor elements, a gas compression torque $T_G$ and an electromagnetic torque $T_M$ act in directions as shown in FIG. 12 respectively. In FIG. 12, the torques $T_G$ and $T_M$ are positive when the rotating direction is clockwise and negative when the rotating direction is counterclockwise.

The equations of motion of the rotating system and stationary system shown in FIG. 12 are given by the following equations respectively:

$$J_R \frac{d^2\phi_R}{dt^2} = T_G - T_M \quad (1)$$

$$J_S \frac{d^2\phi_S}{dt^2} + K\phi = T_M - T_G \quad (2)$$

In the equations (1) and (2), $J_R$ and $J_S$ are the moments of inertia and $$J_R \frac{d^2\phi_R}{dt^2} \text{ and } J_S \frac{d^2\phi_S}{dt^2}$$

are the inertia torques of the rotating side and stationary side, respectively. $T_G - T_M$ corresponds to the difference torque, K is the spring constant of springs supporting the compressor, $\phi_R$ and $\phi_S$ are the respective rotation angles of the rotating and stationary sides and the angular velocity $\omega$ of rotation of the rotating side is expressed as $$\omega = \frac{d\phi_R}{dt}.$$

Figure 13:
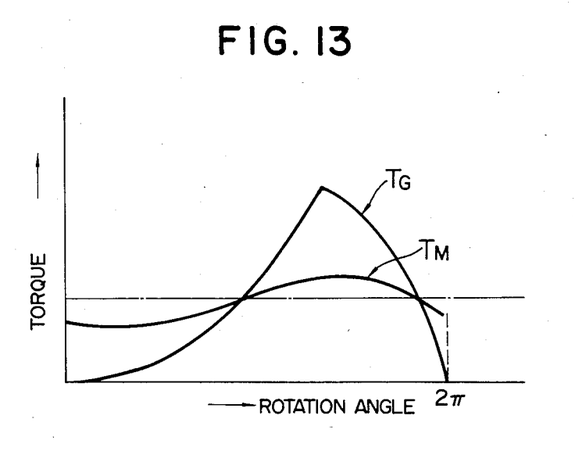
FIG. 13 shows torque variations occurring during one revolution of the main shaft shown in FIG. 12.

FIG. 13 shows torque variations occurring during rotation of the main shaft 16 in the rotary compressor. It will be seen in FIG. 13 that the load torque varies greatly depending on the angular position in rotation of the main shaft 16. Whereas the electromagnetic torque produced by the conventional motor element does not relatively vary.

It will be apparent from the equation (1) that, in the range where $T_G > T_M$ in FIG. 13, $$\frac{d^2\phi_R}{dt^2} = \frac{d\omega}{dt} > 0,$$

and the rotation speed tends to increase. On the other hand, in the range where $$T_G < T_M, \frac{d\omega}{dt} < 0,$$

and the rotation speed tends to decrease. Thus, a variation occurs in the rotation speed of the main shaft 16 in the rotating system because the difference torque $T_G - T_M$ varies with time. As will be apparent from the equation (2), this rotation speed variation acts as an exciting force in the stationary side, resulting in vibration of the housing 19 in the direction of rotation of the main shaft 16.

Therefore, when the electromagnetic torque $T_M$ produced by the motor element is so controlled as to maintain the relation $T_M = T_G$ at all the angular positions of rotation of the main shaft 16, the value of $\frac{d\omega}{dt}$ is $\frac{d\omega}{dt} = 0$, and no rotation speed variation occurs. In the stationary system too, the exciting force appearing as a result of the torque variation is cancelled to eliminate the vibration of the housing 19 in the direction of rotation of the main shaft 16.

The present invention is based on the above concept. According to the present invention, variations in the rotation speed of the rotary main shaft in each revolution due to torque variations are detected by suitable means, current values to be supplied to the motor element for eliminating rotation speed variations at all the angular positions of rotation of the main shaft are computed and stored, and, in the next revolution of the main shaft, that is, at a 360° advanced angular position of the main shaft, the current supplied to the motor element is controlled on the basis of the computed and stored current values. Further, since the gas compression torque in the rotary compressor changes periodically with time, it is preferable to measure and hold rotation speed variations in a plurality of revolutions of the main shaft and average the variations separately with respect to the respective different angular positions of the main shaft, thereby obtaining an averaged speed variation pattern during one revolution of the main shaft, on the basis of which the current control is carried out thereby eliminating noise attributable to accidential rotation speed variation and ensuring more reliable torque control.

In accordance with one aspect of the present invention, there is provided a torque-controlled rotary machine comprising a motor element, a load element coupled to the motor element through a main shaft to be driven by the motor element, and a torque control apparatus controlling an electromagnetic torque produced by the motor element so that the difference (a difference torque) between the electromagnetic torque of the motor element and a load (absorption) torque of the load element can be reduced to zero, the torque control apparatus controlling the electromagnetic torque of the motor element on the basis of information of the difference torque detected at least in a previous revolution of the main shaft.

DESCRIPTION OF THE PREFERRED EMBODIMENTS

Figure 1:
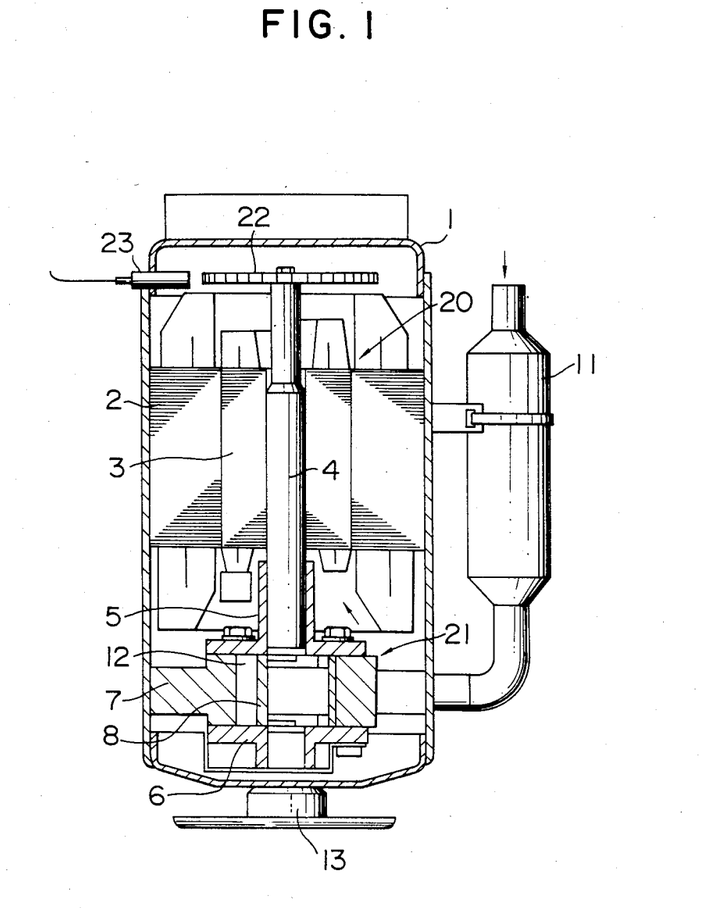
FIG. 1 a longitudinal sectional view of a rotary compressor controlled by an embodiment of the torque control apparatus of the present invention.

FIG. 1 shows schematically the structure of an inverter-driven type rotary compressor which is one form of a rotary machine driven by a motor element (a DC motor) and to which the present invention is applied. The structure of the compressor shown in FIG. 1 is generally similar to that of the prior art compressor disclosed in U.S. Pat. No. 4,604,036 cited hereinbefore. Therefore, parts of the compressor different from those of the prior art compressor will only be described, and description of the same or equivalent parts will be dispensed with.

Referring to FIG. 1, a rotor 3 of a motor element 20 is directly coupled by a rotary main shaft 4 to a rotor 8 of a compression element 21, and a gear 22, whose rotation is to be detected, is fixedly mounted on an extention of one end of the main shaft 4, so that the gear 22 rotates together with the main shaft 4. A gap sensor 23 fixed to a compressor housing 1 senses the teeth of the gear 22 and generates a pulse signal indicative of the rotation speed of the main shaft 4.

Figure 2:
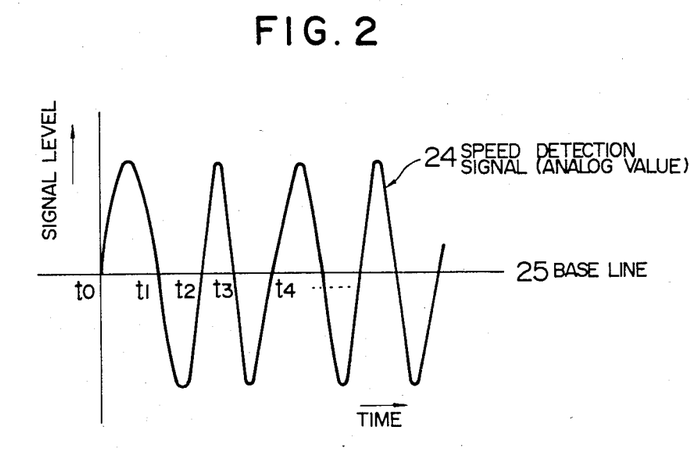
FIG. 2 shows the waveform of the output signal of the gap sensor detecting the rotation speed of the rotary main shaft shown in FIG. 1.
Figure 3:
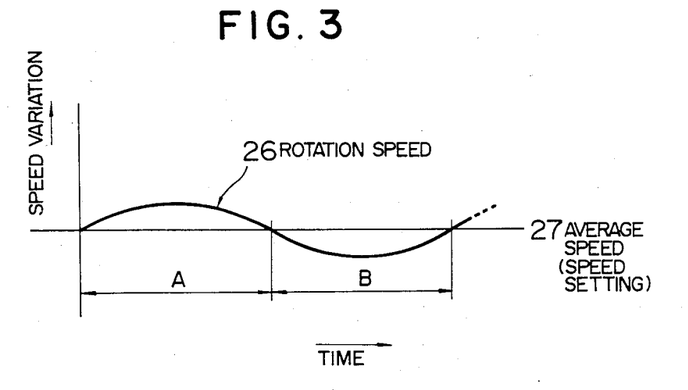
FIG. 3 corresponds to the graph of the rotation speed signal shown in FIG. 2 to illustrate variations of the rotation speed of the main shaft.

FIG. 2 shows the waveform of the rotation speed detection signal 24 generated from the gap sensor 23. A base line 25 shown in FIG. 2 represents the central output level of the detection signal 24. For example, the signal waveform crosses the base line 25 at time $t_0$ and then crosses the base line 25 again at time $t_1$. On the basis of the period of time t between the time $t_0$ and the time $t_1$ and the number of teeth m of the gear 22 sensed in this period t, the rotation speed of the main shaft 4 at the time $t_1$ is determined. FIG. 3 corresponds to the graph shown in FIG. 2 and illustrates variations of the rotation speed 26 of the main shaft 4 with time. In ranges A and B, the rotation speed 26 of the main shaft 4 is higher and lower than the average rotation speed (a speed setting) 27 of the main shaft 4 respectively.

Figure 4:
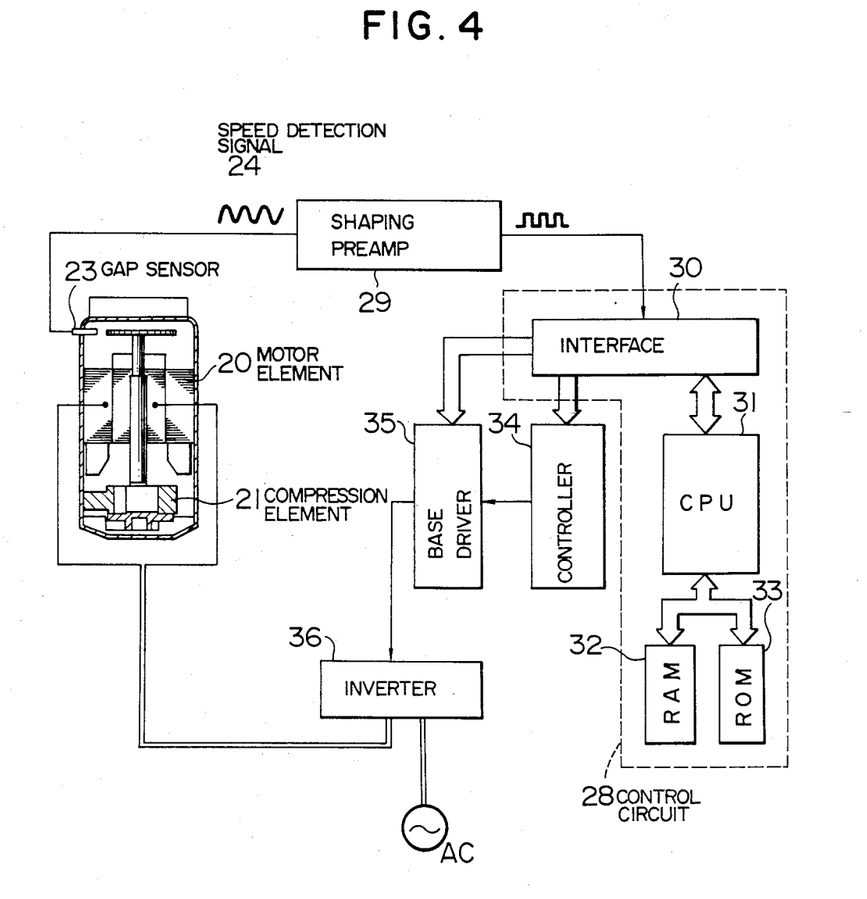
FIG. 4 is a block diagram showing schematically the structure of the torque control apparatus embodying the present invention.

The output signal 24 of the gap sensor 23 is applied to a control circuit 28 shown in FIG. 4, and this control circuit 28 which may be a microcomputer controls the electromagnetic torque produced by the motor element 20. Referring to FIG. 4, the speed detection signal 24 from the gap sensor 23 is converted by a wave-shaping preamplifier 29 into a rectangular-wave signal indicative of momentary variations of the rotation speed of the main shaft 4 in each revolution, and this signal is applied through an interface 30 to a CPU 31. On the basis of the momentary variations of the rotation speed of the main shaft 4, the CPU 31 computes current values to be supplied to the motor element 20 of the compressor so that no rotation speed variations occur in the next revolution of the main shaft 4. The data thus obtained are stored in a RAM 32 until they are required. The data written in the RAM 32 are then read out and supplied to the CPU 31, and, from the CPU 31, the data are supplied to a controller 34 which generates a chopper signal to be applied to a base driver 35, which in turn controls an inverter 36 so that a current which varies according to a pattern corresponding to a variation of desired output torque of the motor is supplied to the motor from the inverter. At the same time, the CPU 31 applies a timing signal to the base driver 35 through the interface 30, so that the inverter 36 produces the current having the pattern determined by the controller 34 at a timing determined according to the angular position of the motor shaft. The inverter 36 driven by the base driver 35 acts to increase and decrease the amount of current supplied to the motor element 20 so that variations of the rotation speed of the main shaft 4 do not occur at all the angular positions of rotation of the main shaft 4. The rotation speed of the main shaft 4 is continuously controlled so as to limit its variations to less than a predetermined allowable value at all times. The series of such control loops are written in a ROM 33.

A flow chart of torque control by the control circuit 28 will be described in detail with reference to FIG. 5.

Figure 5:
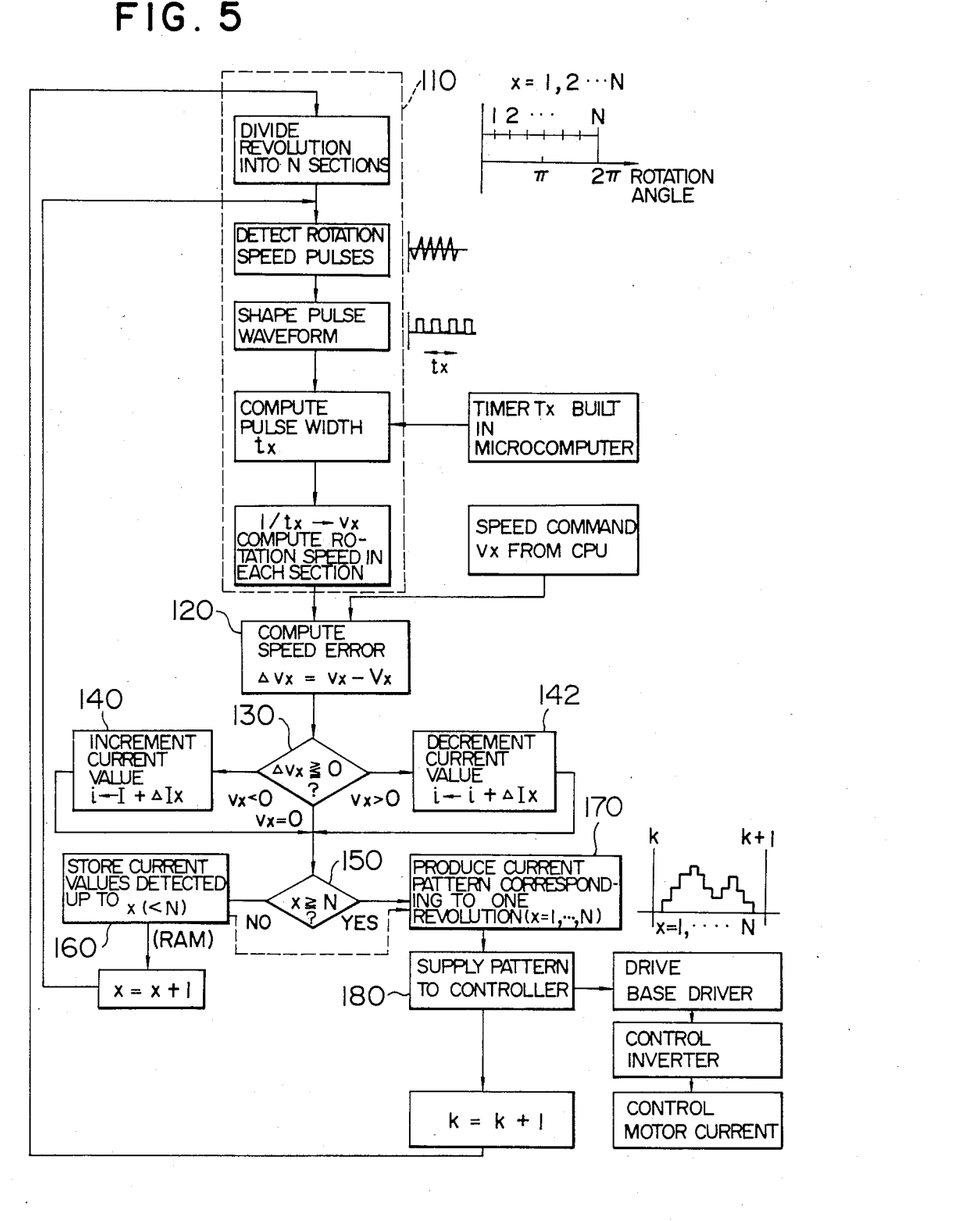
FIG. 5 a flow chart of torque control by the torque control apparatus shown in FIG. 4.

In a step 110 in FIG. 5, one revolution of the main shaft 4 at time $k_1$ is divided into N sections, and the rotation speed $v_x$ of the main shaft 4 in each of the divided sections (1,—, N) is detected. That is, rotation speed pulses detected by the gap sensor 23 are shaped by the wave-shaping preamplifier 29, and the widths $t_x$ of the pulses are computed by a timer $T_x$ built in the microcomputer, thereby computing the rotation speed $v_x$ of the main shaft 4 in each of the sections (x=1,—N).

Then, in a step 120, the rotation speed $v_x$ detected in the ste 110 for each of the individual sections is compared with a rotation speed command $V_x$ applied from the CPU 31 to compute the speed error $\Delta v_x = v_x - V_x$, and the step 120 is followed by a step 30. In the step 130, the relative magnitudes of the detected speed $v_x$ and the commanded speed $V_x$ are compared. When the result of the comparison in the step 130 proves that the detected speed $v_x$ is lower than the commanded speed $V_x$, that is, when the speed error $\Delta v_x (=v_x - V_x) < 0$, the step 130 is followed by a step 140. In the step 140, a required current increment $\Delta I_x$ is computed which is to be added to the current value being supplied to the motor element 20 so that the speed error $\Delta v_x$ can be reduced to zero, and the step 140 is followed by a step 150. On the other hand, when the result of the comparison in the step 130 proves that the detected speed $v_x$ is higher than the commanded speed $V_x$, that is, when the speed error $\Delta v_x > 0$, the step 130 is followed by a step 142. In the step 142, a required current decrement $\Delta I_x$ is computed which is to be subtracted from the current value being supplied to the motor element 20 so as to reduce the speed error $\Delta v_x$ to zero, and the step 142 is followed by the step 150. On the other hand, when the result of the comparison in the step 130 proves that $v_x = V_x$, that is, When the speed error $\Delta v_x = 0$, the step 130 is directly followed by the step 150. In this step 150, a comparison is made as to whether or not $x \geq N$, that is, whether or not the speed errors $\Delta v_x$ have been computed for all of the N sections (x=1 to N). When the result of the comparison in the step 150 proves that $x < N$, the step 150 is followed by a step 160 in which the required current values computed on the basis of the speed errors $\Delta v_x$ for all of the sections x ($<N$) compared in the step 150 are stored in the RAM 32. Then, x is incremented to $x \rightarrow x+1$, and the program returns to the rotation-speed pulse detection step 110 to repeat the same flow.

On the other hand, when the result of the comparison in the step 150 proves that $x \geq N$, the step 150 is followed by a step 170. In this step 170, the current value information for all the sections x (=1 to N) stored in the RAM 32 are read out to produce a current pattern corresponding to one revolution (divided into the N sections) of the main shaft 4, thereby controlling the rotation speed of the main shaft 4. In a step 180 following the step 170, the base driver 35 is driven under control of the controller 34 on the basis of the current pattern thus produced, thereby controlling the electromagnetic torque of the motor element 20. Thus, in this step 180, the drive signal driving the base driver 35 is generated. Then, k is incremented to $k \rightarrow k+1$, and the program returns to the step 110 to repeat the same flow.

Figure 6:
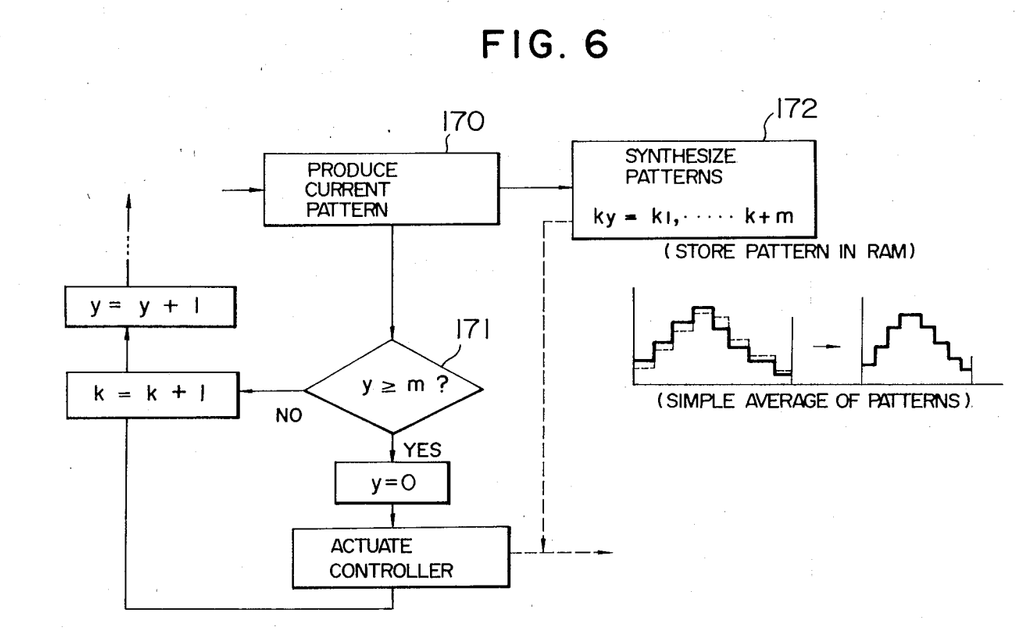
FIG. 6 a partial modification of the flow chart shown in FIG. 5.

In the flow chart of FIG. 5, the information of rotation speed variations detected in a preceding revolution of the main shaft 4 before the present time are used to compute the amounts of current to be supplied to the motor element 20, thereby controlling the rotation speed of the main shaft 4. In a modification as shown in FIG. 6, information of rotation speed variations detected in previous plural revolutions of the main shaft 4 before the present time are stored and statistically processed so as to determine the amounts of motor current on the basis of the statistical data, thereby controlling the rotation speed of the main shaft 4. In the flow chart of FIG. 6, the control flow from the step 170 to the step 180 differs from that of FIG. 5, and the remaining steps are the same as those of the control flow shown in FIG. 5. Therefore, the difference will only be described with reference to FIG. 6. In the step 170 in FIG. 6, a current pattern corresponding to one revolution of the main shaft 4 at time $k_y$ is produced and stored in the RAM 32. Then, in a step 171, whether y is larger or smaller than m is determined by comparing the two. When the result of this comparison proves that y<m, k is incremented to $k \rightarrow k+1$, and the program returns to the step 110 so as to produce a current pattern corresponding to one revolution of the main shaft 4 at time k+1. On the other hand, when the result of the comparison in the step 171 proves that $y \geq m$, the controller 34 generates a drive signal driving the base driver 35. Successive current patterns produced in the step 170 are synthesized in the CPU 31, and this synthesized current pattern is stored in the RAM 32. The synthesized current pattern stored in the RAM 32 is continually applied to the controller 34, so that, when the controller 34 is actuated by an actuating signal applied thereto as a result of the comparison made in the step 171, the controller 34 drives the base driver 35 on the basis of the synthesized current control pattern.

According to the above manner of pattern averaging, noise that may appear due to an accidental variation of the rotation speed of the main shaft 4 can be removed because rotation speed variations of the main shaft 4 occur periodically. Therefore, the rotation speed of the main shaft 4 can be controlled with high reliability.

As the means of statistical processing for producing the synthesized current pattern shown in the step 172, a method may be employed in which rotation speed variations detected in past plural revolutions (m revolutions) for each of the N-divided angular positions of rotation of the main shaft 4 are simply averaged, and such averaged values are used to form the current pattern. In such a case, smoothing of the current pattern signal by a low-pass filter is effective for removing high-frequency noise components.

Figure 7:
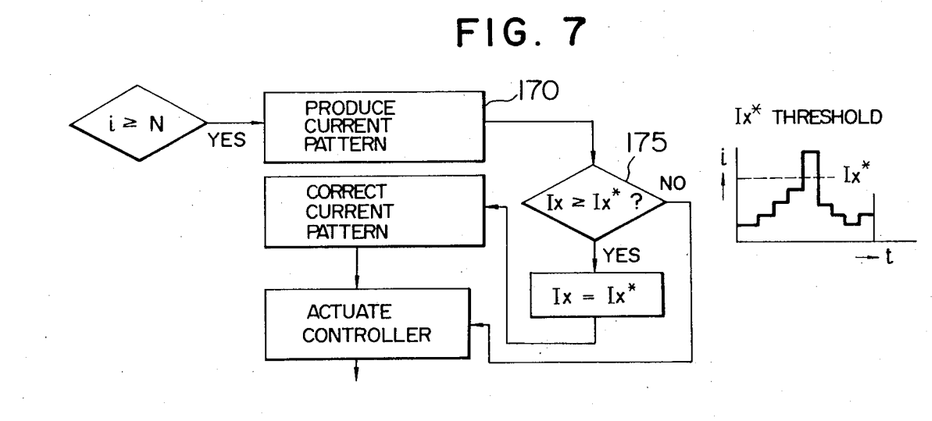
FIGS. 7 and 8 are partial modifications of the flow chart shown in FIG. 6.

In the step 170 shown in FIG. 5, the current pattern corresponding to one revolution of the main shaft 4 is formed by detecting the speed error $\Delta v_x$ in each of the N sections. However, such a manner of current pattern formation may pick up excessively large, temporary variations attributable to external factors. Effective means for preventing pickup of such variations is shown in FIG. 7. In FIG. 7, a threshold $I_X^*$ is provided, and variations exceeding this threshold $I_x^*$ are ignored in the step of averaging so as to minimize an adverse effect due to disturbance. Referring to FIG. 7, the step 170 of forming the current pattern at time k is followed by a step 175 in which a comparison is made as to whether $I_x \geq I_x^*$ or not. When the result of the comparison in the step 170 is YES, $I_x$ is regarded to be $I_x = I_x^*$, and the current pattern is corrected by ignoring variations exceeding $I_x = I_x^*$. Then, the controller 34 is actuated to drive the base driver 35 on the basis of the corrected current pattern. When, on the other hand, the result of the comparison proves that $I_x \leq I_x^*$, the current pattern produced in the step 170 is not corrected, and the controller 34 is actuated to drive the base driver 35 on the basis of this noncorrected current pattern. The threshold $I_x^*$ is determined in two ways. In one way, the threshold $I_x^*$ is previously experimentally determined. In the other way, the threshold $I_x^*$ is computed on the basis of $I_{x-1}$ and $I_{x+1}$ each time these values are detected.

Figure 8:
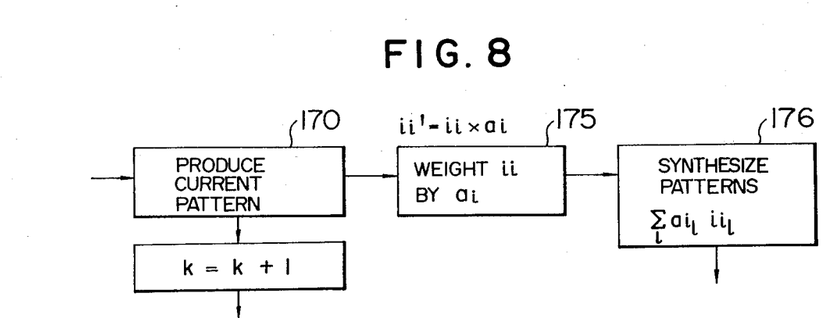
Figure 9:
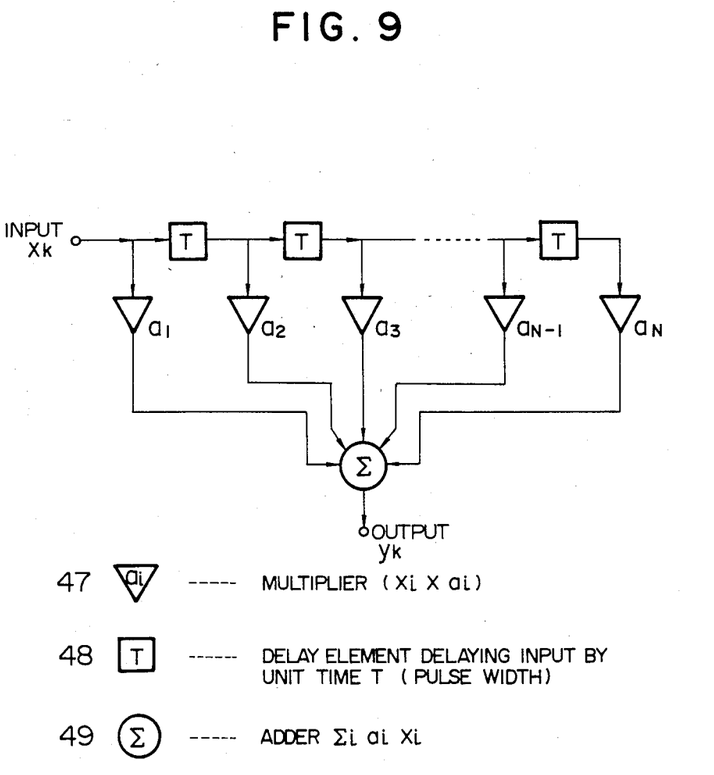
FIG. 9 is a circuit diagram of a digital filter preferably used for the statistical processing shown in FIG. 8.

As another method of statistical processing made in the step 172 shown in FIG. 6, a running average model method as shown in FIG. 8 is also effectively used. According to this method, weighted running averages of rotation speed variation data (input data) applied in a time serial fashion are computed as shown by the following expression (3):

$$y_k = \sum_{l=1}^{n} a_l x_{k-l+1} \quad (3)$$

where $x_k$ is a k-th time-serial input data (applied at a time interval T), $y_k$ is an output data (a statistic), and $a_l$ is a coefficient parameter. Such a method of statistical processing is carried out by the use of a linear, nonrecursive type digital filter as shown in FIG. 9. The digital filter shown in FIG. 9 is composed of multipliers 47, unit-time delay elements 48 and an adder 49 to generate the output $y_k$ in response to the application of the input $x_k$.

In the modification shown in FIG. 8, the step 170 of forming the current pattern is followed by a step 175 in which current information $i_i$ acquired immediately before the present stage among those acquired in the past is weighted by a weight $a_i$ to correct the current pattern. Then, such corrected current patterns are synthesized in a step 176, and the controller 34 is actuated to drive the base driver 35 on the basis of the synthesized current pattern.

It is a notable fact that there are no effective methods of detecting torque variations in the rotating side, except the method of acquiring the information of rotation speed variations of the main shaft 4. In the aforementioned embodiment, the gap sensor 23 is used as means for detecting rotation speed variations of the main shaft 4 and generates rotation speed pulses to be referenced. However, a sensor-less arrangement which does not require provision of such a sensor in the compressor may be used for acquiring the information of rotation speed variations. That is, it is known from the Fleming's rule that, when current flows through each of conductors of a DC motor, a counter-electromotive force is induced in a direction opposite to the flowing direction of the current, and its magnitude is proportional to the rotation speed of the motor. Thus, the information of rotation speed variations of the rotating system can be obtained by detecting changes in the current due to changes in the counter-electromotive force caused by the rotation speed variations.

Figure 10:
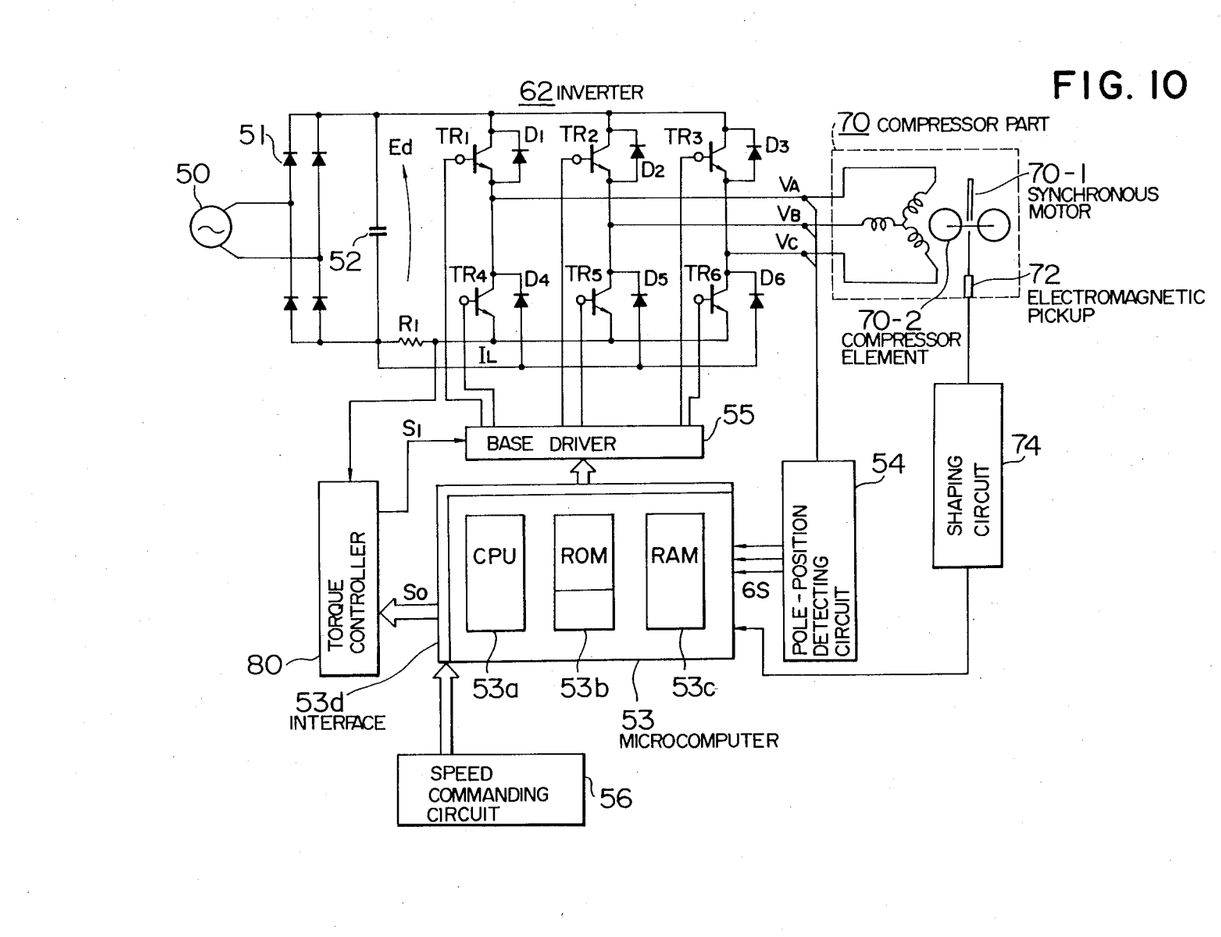
FIG. 10 is a block diagram showing the general structure of another embodiment of the torque control apparatus when the present invention is applied to a compressor driven by a brushless DC motor.

FIG. 10 shows the general structure of another embodiment of the torque control apparatus in which a brushless DC motor is used as the motor element.

Referring to FIG. 10, an AC power source 50 is connected through a rectifier circuit 51 and a smoothing capacitor 52 to an inverter 62 to supply a DC voltage $E_d$ to the inverter 62.

This inverter 62 is of a 120° conduction type composed of transistors $TR_1$ to $TR_6$ and feedback diodes $D_1$ to $D_6$. In the inverter 62, the 120° conduction period of the transistors $TR_1$ to $TR_3$ connected to the positive potential side of the capacitor 52, across which the DC voltage $E_d$ appears, is pulse-width modulated, so that these transistors operate as a chopper to control the AC output voltage of the inverter 62.

A resistor $R_1$ having a low resistance is connected between common emitter terminals of the transistors $TR_4$ to $TR_6$ and common anode terminals of the diodes $D_4$ to $D_6$.

A compressor part designated generally by the reference numeral 70 includes a synchronous motor 70-1 having a two-pole permanent magnet of a brushless DC motor in its field system and a compression element 70-2 which is the load of the synchronous motor 70-1.

The armature current $I_L$ flowing through the armature windings of the synchronous motor 70-1 flows also through the resistor $R_1$, and, by detecting the voltage drop accross the resistor $R_1$, the armature current $I_L$ can be detected.

A control circuit controlling the output torque of the synchronous motor 70-1 includes a microcomputer 53, a pole-position detecting circuit 54 detecting the pole positions of the rotor of the synchronous motor 70-1, a torque controller 80 controlling the output torque of the synchronous motor 70-1, a base driver 55 driving the base of the transistors $TR_1$ to $TR_6$, a speed commanding circuit 56 applying to the microcomputer 53 a signal commanding a desired rotation speed, an electromagnetic pickup 72 detecting variations of the rotation speed of the main shaft of the compressor part 70, and a wave shaping circuit 74 shaping the waveform of the output of the pickup 72.

As disclosed in No. JP-A-52-80415, the poleposition detecting circuit 54 is a circuit to which terminal voltages $V_A$, $V_B$ and $V_C$ of the armature windings of the synchronous motor 70-1 are applied through a filter circuit and which generates a position signal 6S indicative of the detected angular position of the rotor of the synchronous motor 70-1.

The microcomputer 53 includes a CPU 53a, a ROM 53b, a RAM 53c and an interface 53d which are interconnected by an address bus, a data bus and a control bus (not shown). The ROM 53b stores a control program required for driving the synchronous motor 70-1 on the basis of data acquired in preceding one revolution of the compressor main shaft or statistically processed data.

On the other hand, data of speed errors detected in a previous revolution of the compressor main shaft for N sections of the shaft revolution or statistically processed data of speed errors detected in past plural revolutions of the compressor main shaft are written in the RAM 53c.

On the basis of the information of rotation speed variations of the compressor main shaft, a current pattern corresponding to one revolution of the compressor main shaft or an averaged current pattern corresponding to plural revolutions of the compressor main shaft is produced, and the torque controller 80 controls the armature current using such a current pattern.

In the brushless DC motor, the current flowing through the armature windings is proportional to the output torque of the motor. Therefore, by controlling the armature current of the motor, the output torque of the motor can be controlled.

Figure 11:
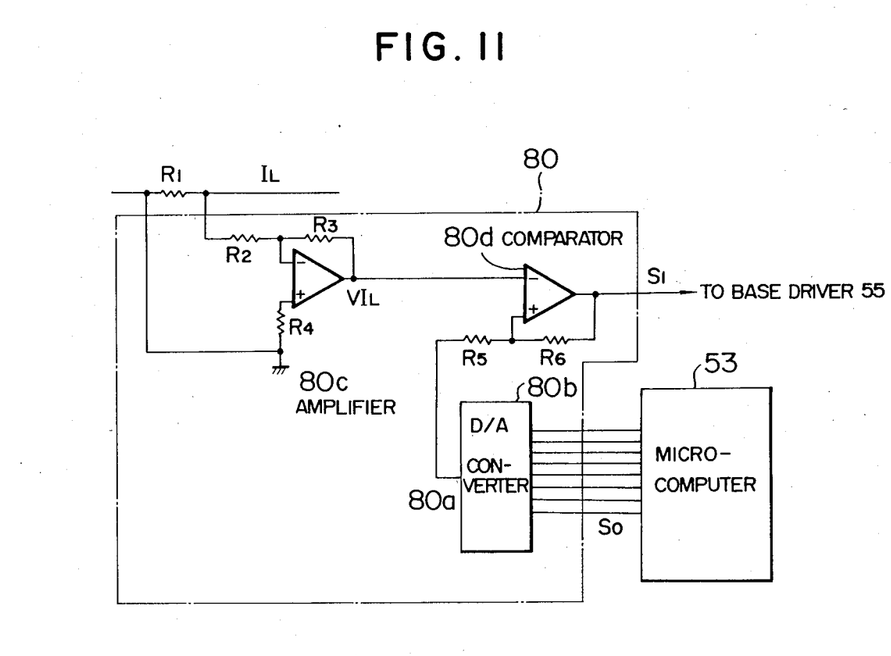
FIG. 11 is a circuit diagram of the torque controller shown in FIG. 10.

FIG. 11 shows the detailed structure of the torque controller 80. As shown in FIG. 11, the torque controller 80 includes a D/A converter 80b acting as a current commanding circuit, an amplifier 80c acting as a current detecting circuit, and a comparator 80d acting as a comparing circuit having a hysteresis characteristic.

An 8-bit speed error data $S_0$ read out from the RAM 53c of the microcomputer 53 is converted by the D/A converter 80b into an analog data which provides a current command value 80a as shown.

The armature current $I_L$ detected as the voltage drop across the resistor $R_1$ is amplified by the amplifier 80c to provide a detected current value $V_{IL}$ which is compared with the current command value 80a in the comparator 80d. A chopper signal $S_1$ appears at the output of the comparator 80d for switching the transistors $TR_1$ to $TR_3$ in the inverter 62.

The foregoing has referred to the manner of controlling the output torque of an inverter-driven motor element of a closed rotary compressor. However, the present invention is in no way limited to such a specific application and is equally effectively applicable to any one of various rotary machines which are driven by a motor element and in which load (absorption) torque varies periodically.

It will be apparent from the foregoing detailed description that, by application of the present invention to a rotary machine which is driven by a motor element and in which load torque varies periodically, variations of the rotation speed of the rotating system can be greatly reduced. In other words, vibrations of the entire housing of the stationary side can be greatly reduced, and, especially, vibration-free low-speed operation of the rotary machine near the resonance point or in a range lower than the resonance point can be achieved. Further, since vibration of the rotary machine can be reduced, the vibration-proof structure can be greatly simplified. Therefore, the power consumption of the rotary machine can be saved by operating the rotary machine in a wide range of variable speeds, and the scale of a system in which the rotary machine is incorporated can be reduced.

We claim:

1. A torque-controlled rotary machine comprising:
   a motor element;
   a load element coupled to said motor element through a main shaft to be driven by said motor element; and
   a torque control apparatus controlling an electromagnetic torque produced by said motor element such that a torque difference between the electromagnetic torque of said motor element and a load torque of said load element can be reduced to zero, said torque control apparatus controlling the electromagnetic torque of said motor element on the basis of information of the torque difference detected in at least one revolution of the main shaft, said torque control apparatus including rotation-speed variation detecting means for detecting variations of the rotation speed of the main shaft, computing means for computing control values required for controlling the electromagnetic torque of said motor element on the basis of the rotation speed variations detected by said rotation-speed variation detecting means, memory means for storing the control values provided by said computing means, and output control means for reading out the control values stored in said memory means as required and supplying the control values to control the output torque of said motor element.

2. A torque-controlled rotary machine comprising:
   a motor element;
   a load element coupled to said motor element through a main shaft to be driven by said motor element; and
   a torque control apparatus controlling an electromagnetic torque produced by said motor element such that a torque difference between the electromagnetic torque of said motor element and a load torque of said load element can be reduced to zero, said torque control apparatus controlling the electromagnetic torque of said motor element on the basis of information of the torque difference detected in at least one previous revolution of the main shaft, said torque control apparatus including rotation-speed variation detecting means for detecting variations of the rotation speed of the main shaft, computing means for computing control values required for controlling the electromagnetic torque of said motor element on the basis of the rotation speed variations detected by said rotation-speed variation detecting means, memory means for storing the control values provided by said computing means, the output control means for reading out the control values stored in said memory means as required and supplying the control values to control the output torque of said motor element.

3. A torque-controlled rotary machine comprising:
   a DC motor;
   a compressor coupled to said motor through a main shaft to be driven by said motor; and
   a torque control apparatus controlling an electromagnetic torque produced by said motor such that a torque difference between the electromagnetic torque of said motor and a load torque of said compressor can be reduced to zero, said torque control apparatus controlling the electromagnetic torque of said motor on the basis of information of the torque difference detected in at least one revolution of the main shaft, said torque control apparatus including rotation-speed variation detecting means for detecting variations of the rotation speed of the main shaft, computing means for computing control values required for controlling the electromagnetic torque of said DC motor on the basis of the rotation speed variations detected by said rotation-speed variation detecting means, memory means for storing the control values provided by said computing means, and output control means for reading out the control values stored in said memory means as required and supplying the control values to control the output torque of said DC motor.

4. A torque-controlled rotary machine comprising:
a motor element;
a load element coupled to said motor element through a main shaft to be driven by said motor element; and
torque control means for controlling an electromagnetic torque produced by said motor element such that a torque difference between the electromagnetic torque of said motor element and a load torque of said load is reduced substantially to zero, said torque control means including means for detecting deviations of a rotating speed of said main shaft from a reference value at predetermined angular positions of said main shaft, respectively, during each revolution thereof, means for determining corrected values of electric energy to be supplied to said motor element at the respective angular positions of said main shaft based on the deviations of the rotating speed of said main shaft detected during at least one revolution, and means for controlling the electric energy supplied to said motor element such that said corrected values at the respective angular positions of said main shaft are supplied during a revolution subsequent to said one revolution.

5. A torque-controlled rotary machine as claimed in claim 4, wherein said corrected values of electric energy are determined based on said deviations of the rotating speed of said main shaft detected during said one revolution of said main shaft, said one revolution immediately preceding said subsequent revolution.

6. A torque-controlled rotary machine as claimed in claim 4, wherein said corrected values of electric energy are determined based on said deviations of the rotating speed of said main shaft detected during a plurality of revolutions of the main shaft, said plurality of revolutions immediately preceding said subsequent revolution.

7. A torque-controlled rotary machine as claimed in claim 4, wherein said deviation detecting means includes means for detecting the rotating speed of said main shaft during a time interval required for said motor shaft to move from one of said angular positions to another.

8. A torque-controlled rotary machine comprising:
a DC motor;
a compressor coupled to said DC motor through a main shaft to be driven by said motor; and
torque control means for controlling an electromagnetic torque produced by said motor such that a torque difference between the electromagnetic torque of said motor and a load torque of said compressor is reduced substantially to zero, said torque control means including means for detecting deviations of a rotating speed of said main shaft from a reference value at predetermined angular positions of said main shaft, respectively, during each revolution thereof, means for determining corrected values of electric energy to be supplied to said DC motor at the respcetive angular positions of said main shaft based on the deviations of the rotating speed of said main shaft detected during at least one revolution, and means for controlling the elctric energy supplied to said motor by using said corrected values at correspondingly respective angular positions of said main shaft during a revolution subsequent to said one revolution.

9. A torque-controlled rotary machine as claimed in claim 8, wherein said corrected values of electric energy are determined based on said deviations of the rotating speed of said main shaft detected during said one revolution of the main shaft, said one revolution immediately preceding said subsequent revolution.

10. A torque-controlled rotary machine as claimed in claim 8, wherein said corrected values of electric energy are determined based on said deviations of the rotating speed of said main shaft detected during a plurality of revolutions of the main shaft, said plurality of revolutions immediately preceding said subsequent revolution.

11. A torque-controlled rotary machine as claimed in claim 8, wherein said deviation detecting means includes means for detecting the rotation speed of said main shaft during a time interval required for said motor shaft to move from one of said angular positions to another.

* * * * *